US012682527B2

(12) United States Patent
Bhandaru et al.

(10) Patent No.: US 12,682,527 B2
(45) Date of Patent: Jul. 14, 2026

(54) SYSTEM AND METHOD FOR DETERMINING FACE EXPRESSIONS TO OPTIMIZE USER EXPERIENCE IN DIGITAL INTERACTIVE PLATFORMS

(71) Applicant: Awone Datasciences Private Limited, Hyderabad (IN)

(72) Inventors: Vamsi Mohan Bhandaru, Hyderabad (IN); Sarabjeet Singh Kochar, Asker (NO)

(73) Assignee: Awone Datasciences Private Limited, Hyderabad (IN)

( * ) Notice: Subject to any disclaimer, the term of this patent is extended or adjusted under 35 U.S.C. 154(b) by 137 days.

(21) Appl. No.: 18/814,763

(22) Filed: Aug. 26, 2024

(65) Prior Publication Data

US 2025/0069307 A1    Feb. 27, 2025

(30) Foreign Application Priority Data

Aug. 24, 2023    (IN) .............................. 202341056787

(51) Int. Cl.
*G06T 13/00* (2011.01)
*G06V 10/70* (2022.01)
*G06V 20/40* (2022.01)
*G06V 40/16* (2022.01)

(52) U.S. Cl.
CPC .............. *G06T 13/00* (2013.01); *G06V 10/70* (2022.01); *G06V 20/40* (2022.01); *G06V 40/171* (2022.01); *G06V 40/174* (2022.01); *G06V 40/161* (2022.01)

(58) Field of Classification Search
CPC ........ G06T 13/00; G06V 10/70; G06V 20/40; G06V 40/171; G06V 40/174; G06V 40/161; A63F 13/53; A63F 13/61; A63F 13/79; A63F 13/67
See application file for complete search history.

(56) References Cited

U.S. PATENT DOCUMENTS

| | | | | |
|---|---|---|---|---|
| 2016/0144278 A1* | 5/2016 | el Kaliouby | ............ | A63F 13/58 |
| | | | | 463/36 |
| 2018/0249209 A1* | 8/2018 | Dey | .................. | H04N 21/4667 |
| 2019/0132646 A1* | 5/2019 | Bharti | .................. | H04N 21/252 |
| 2023/0309883 A1* | 10/2023 | Dhillon | .................. | G16H 40/67 |
| | | | | 600/300 |

(Continued)

*Primary Examiner* — Jitesh Patel
(74) *Attorney, Agent, or Firm* — Jason C. Cameron

(57) ABSTRACT

A computer-implemented system for determining face expressions of users to optimize user experience in digital interactive platforms, is disclosed. The computer-implemented system is configured to: identify first state of the video contents associated with the digital interactive platforms and corresponding animated media contents; determine the face expressions of the users based on the first state of the video contents and the corresponding animated media contents, by a machine learning model; determine an engagement level of the users in the digital interactive platforms based on the determined face expressions of the users; and determine whether second virtual objects is overlaid on first virtual objects present in one or more locations in the video contents, based on the determined engagement level of the users in the digital interactive platforms, to optimize the user experience in the digital interactive platforms, by segmentation and deep learning models.

14 Claims, 5 Drawing Sheets

100

102

104

Communication network
110

Computer-Implemented System
106

Plurality of Subsystems
108

(56)                    References Cited

U.S. PATENT DOCUMENTS

| | | | |
|---|---|---|---|
| 2023/0316662 A1* | 10/2023 | Singh ................. | G06Q 30/0277 |
| | | | 345/633 |
| 2024/0267589 A1* | 8/2024 | Cyriac ............... | H04N 21/4223 |
| 2024/0325923 A1* | 10/2024 | Hill ......................... | A63F 13/79 |

* cited by examiner

100

102

104

Communication
network
110

Computer-Implemented
System
106

Plurality of
Subsystems
108

106

Memory 202

Plurality of Subsystems 108

Video Content Generating Subsystem 204

Video Identifying Subsystem 206

Expression Determining Subsystem 208

Engagement Level Determining Subsystem 210

Object Overlaying Subsystem 212

System Bus 214

Database 216

Hardware Processor(s) 218

300

400

GENERATE ONE OR MORE VIDEO CONTENTS ASSOCIATED WITH ONE OR MORE DIGITAL INTERACTIVE PLATFORMS — 402

IDENTIFY AT LEAST ONE OF: A FIRST STATE OF THE ONE OR MORE VIDEO CONTENTS ASSOCIATED WITH THE ONE OR MORE DIGITAL INTERACTIVE PLATFORMS AND CORRESPONDING ONE OR MORE ANIMATED MEDIA CONTENTS PLAYED IN THE ONE OR MORE VIDEO CONTENTS ASSOCIATED WITH THE ONE OR MORE DIGITAL INTERACTIVE PLATFORMS — 404

DETERMINE ONE OR MORE FACE EXPRESSIONS OF ONE OR MORE USERS BASED ON THE FIRST STATE OF THE ONE OR MORE VIDEO CONTENTS ASSOCIATED WITH THE ONE OR MORE DIGITAL INTERACTIVE PLATFORMS AND THE CORRESPONDING ONE OR MORE ANIMATED MEDIA CONTENTS PLAYED IN THE ONE OR MORE VIDEO CONTENTS ASSOCIATED WITH THE ONE OR MORE DIGITAL INTERACTIVE PLATFORMS, BY A MACHINE LEARNING MODEL — 406

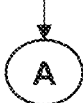

DETERMINE AN ENGAGEMENT LEVEL OF THE ONE OR MORE USERS IN THE ONE OR MORE DIGITAL INTERACTIVE PLATFORMS BASED ON THE ONE OR MORE DETERMINED FACE EXPRESSIONS OF THE ONE OR MORE USERS ~408

DETERMINE WHETHER SECOND ONE OR MORE VIRTUAL OBJECTS IS OVERLAID ON FIRST ONE OR MORE VIRTUAL OBJECTS PRESENT IN ONE OR MORE LOCATIONS IN THE ONE OR MORE VIDEO CONTENTS ASSOCIATED WITH THE ONE OR MORE DIGITAL INTERACTIVE PLATFORMS, BASED ON THE DETERMINED ENGAGEMENT LEVEL OF THE ONE OR MORE USERS IN THE ONE OR MORE DIGITAL INTERACTIVE PLATFORMS, TO OPTIMIZE USER EXPERIENCE IN THE ONE OR MORE DIGITAL INTERACTIVE PLATFORMS, BY AT LEAST ONE OF: A SEGMENTATION MODEL AND A DEEP LEARNING MODEL ~410

FIG. 4

SYSTEM AND METHOD FOR DETERMINING FACE EXPRESSIONS TO OPTIMIZE USER EXPERIENCE IN DIGITAL INTERACTIVE PLATFORMS

CROSS-REFERENCE TO RELATED APPLICATION(S)

This application claims the priority to incorporate by reference the entire disclosure of Indian Patent Application No. 202341056787, filed on Aug. 24, 2023, and titled "SYSTEM AND METHOD FOR DETERMINING FACE EXPRESSIONS TO OPTIMIZE USER EXPERIENCE IN DIGITAL INTERACTIVE PLATFORMS".

FIELD OF INVENTION

Embodiments of the present disclosure relate to a user engagement system in digital interactive platforms and more particularly relate to a computer-implemented system and method for determining one or more face expressions of one or more users to optimize a user experience in one or more digital interactive platforms.

BACKGROUND

Sports and iGaming industry has experienced a significant intersection in recent years, with both sectors benefiting from their collaboration. A merging of sports and iGaming has created new opportunities for entertainment, engagement, and revenue generation.

Digital interactive platforms are simulated versions of real sports events that are accessed and bet on through online platforms. These digital interactive platforms simulations use advanced algorithms and graphics to mimic an excitement of live sports. The digital interactive platforms allow fans to experience thrills of sports betting even when there are no real events taking place. The digital interactive platforms with continuous streams create user experience that appeals to iGaming and sports enthusiasts.

There are existing inventions configured to increase user experiences to the fans/users by playing sports related contents in the digital interactive platforms. However, the existing inventions provide only prestored sports related contents, which cause the fans/users bored during playing of the digital interactive platforms. Further, the interest of the fans/users during playing of the digital interactive platforms may be reduced due to repetition of the sports related contents played during the digital interactive platforms.

Therefore, there is a need for an improved system and method for determining one or more expressions of one or more users to optimize a user experience in one or more digital interactive platforms, to address the aforementioned issues.

SUMMARY

This summary is provided to introduce a selection of concepts, in a simple manner, which is further described in the detailed description of the disclosure. This summary is neither intended to identify key or essential inventive concepts of the subject matter nor to determine the scope of the disclosure.

In accordance with one embodiment of the disclosure, a computer-implemented system for determining one or more face expressions of one or more users to optimize a user experience in one or more digital interactive platforms. The computer-implemented system includes one or more hardware processors and a memory. The memory is coupled to the one or more hardware processors. The memory comprises a set of program instructions in form of a plurality of subsystems, configured to be executed by the one or more hardware processors. The plurality of subsystems comprises a video content generating subsystem, a video identifying subsystem, an expression determining subsystem, an engagement level determining subsystem, and an object overlaying subsystem.

The video content generating subsystem is configured to generate one or more video contents associated with the one or more digital interactive platforms.

The video identifying subsystem is configured to identify at least one of: a first state of the one or more video contents associated with the one or more digital interactive platforms and corresponding one or more animated media contents played in the one or more video contents associated with the one or more digital interactive platforms.

The expression determining subsystem configured to determine the one or more face expressions of the one or more users based on the first state of the one or more video contents associated with the one or more digital interactive platforms and the corresponding one or more animated media contents played in the one or more video contents associated with the one or more digital interactive platforms, by a machine learning model.

The engagement level determining subsystem configured to determine an engagement level of the one or more users in the one or more digital interactive platforms based on the one or more determined face expressions of the one or more users.

The object overlaying subsystem configured to determine whether second one or more virtual objects is overlaid on first one or more virtual objects present in one or more locations in the one or more video contents associated with the one or more digital interactive platforms, based on the determined engagement level of the one or more users in the one or more digital interactive platforms, to optimize the user experience in the one or more digital interactive platforms, by at least one of: a segmentation model and a deep learning model.

The overlaid of the second one or more virtual objects on the first one or more virtual objects is played with the one or more video contents based on the determined engagement level of the one or more users in the one or more digital interactive platforms.

In an embodiment, in determining, by the machine learning model, the one or more face expressions of the one or more users, the expression determining subsystem is configured to obtain data associated with at least one of: the first state of the one or more video contents associated with the one or more digital interactive platforms and the corresponding one or more animated media contents played in the one or more video contents associated with the one or more digital interactive platforms, from the video identifying subsystem. The expression determining subsystem is further configured to compare the obtained data associated with at least one of: the first state of the one or more video contents associated with the one or more digital interactive platforms and the corresponding one or more animated media contents played in the one or more video contents associated with the one or more digital interactive platforms, with pre-stored data associated with one or more characters assigned with one or more face expressions.

The expression determining subsystem is further configured to identify the one or more characters assigned with the one or more face expressions based on the comparison of the obtained data associated with at least one of: the first state of the one or more video contents associated with the one or more digital interactive platforms and the corresponding one or more animated media contents played in the one or more video contents associated with the one or more digital interactive platforms, with the pre-stored data associated with the one or more characters assigned with the one or more face expressions.

The expression determining subsystem is further configured to determine the one or more face expressions of the one or more users based on the identification of the one or more characters assigned with the one or more face expressions.

In another embodiment, in determining, by the segmentation model, whether the second one or more virtual objects is overlaid on the first one or more virtual objects present in the one or more locations in the one or more video contents associated with the one or more digital interactive platforms, the object overlaying subsystem is configured to identify one or more keypoints of the first one or more virtual objects present in the one or more locations in the one or more video contents.

The object overlaying subsystem is further configured to segment the first one or more virtual objects in the one or more video contents. The first one or more virtual objects comprises at least one of: the one or more characters, a virtual ground associated with the one or more digital interactive platforms. The object overlaying subsystem is further configured to overlay the second one or more virtual objects on the first one or more virtual objects present in one or more locations in the one or more video contents associated with the one or more digital interactive platforms.

In yet another embodiment, the object overlaying subsystem is further configured to identify the one or more locations comprising the first one or more virtual objects in the one or more video contents, on which the second one or more virtual objects is overlaid, by the deep learning model. The one or more locations in the one or more video contents is changed over a time period.

In yet another embodiment, the object overlaying subsystem is further configured to determine temporal stability between the second one or more virtual objects and the first one or more virtual objects present in the one or more locations in the one or more video contents on which the second one or more virtual objects is overlaid, by analyzing changes in the one or more keypoints associated with the first one or more virtual objects, based on a non-maximum suppression (NMS) method.

In yet another embodiment, the changes in the one or more keypoints associated with the first one or more virtual objects are analyzed based on determination of whether one bounding box is enclosed over one or more regions of the first one or more virtual objects present in the one or more locations in the one or more video contents.

In yet another embodiment, the object overlaying subsystem is further configured to perform real-time operations of identification of the one or more locations in the one or more video contents based on a Pyodide application.

In one aspect, a computer-implemented method for determining one or more face expressions of one or more users to optimize a user experience in one or more digital interactive platforms, is disclosed. The computer-implemented method comprises generating, by one or more hardware processors, one or more video contents associated with the one or more digital interactive platforms.

The computer-implemented method further comprises identifying, by the one or more hardware processors, at least one of: a first state of the one or more video contents associated with the one or more digital interactive platforms and corresponding one or more animated media contents played in the one or more video contents associated with the one or more digital interactive platforms.

The computer-implemented method further comprises determining, by the one or more hardware processors, the one or more face expressions of the one or more users based on the first state of the one or more video contents associated with the one or more digital interactive platforms and the corresponding one or more animated media contents played in the one or more video contents associated with the one or more digital interactive platforms, by a machine learning model.

The computer-implemented method further comprises determining, by the one or more hardware processors, an engagement level of the one or more users in the one or more digital interactive platforms based on the one or more determined face expressions of the one or more users.

The computer-implemented method further comprises determining, by the one or more hardware processors, whether second one or more virtual objects is overlaid on first one or more virtual objects present in one or more locations in the one or more video contents associated with the one or more digital interactive platforms, based on the determined engagement level of the one or more users in the one or more digital interactive platforms, to optimize the user experience in the one or more digital interactive platforms, by at least one of: a segmentation model and a deep learning model.

The overlaid of the second one or more virtual objects on the first one or more virtual objects is played with the one or more video contents based on the determined engagement level of the one or more users in the one or more digital interactive platforms.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which:

FIG. 4 is a flow chart depicting a computer-implemented method for determining the one or more face expressions of the one or more users to optimize the user experience in the one or more digital interactive platforms, in accordance with an embodiment of the present disclosure.

Figure 1:
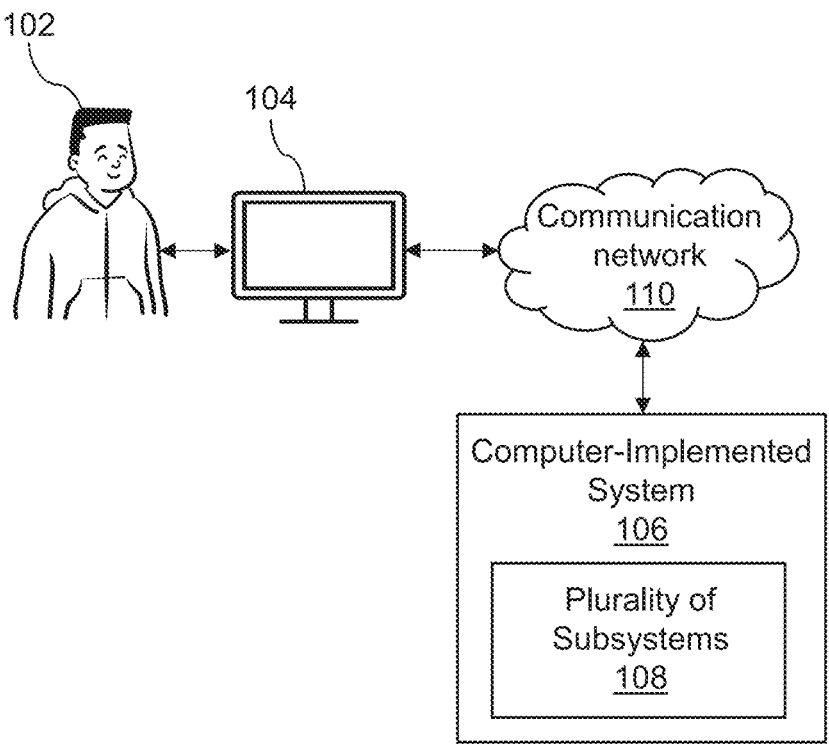
FIG. 1 is a block diagram of a computer-implemented system for determining one or more expressions of one or more users to optimize a user experience in one or more digital interactive platforms, in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated online platform, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or subsystems or elements or structures or components preceded by "comprises . . . a" does not, without more constraints, preclude the existence of other devices, subsystems, elements, structures, components, additional devices, additional subsystems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

A computer system (standalone, client or server computer system) configured by an application may constitute a "module" (or "subsystem") that is configured and operated to perform certain operations. In one embodiment, the "module" or "subsystem" may be implemented mechanically or electronically, so a module include dedicated circuitry or logic that is permanently configured (within a special-purpose processor) to perform certain operations. In another embodiment, a "module" or "subsystem" may also comprise programmable logic or circuitry (as encompassed within a general-purpose processor or other programmable processor) that is temporarily configured by software to perform certain operations.

Accordingly, the term "module" or "subsystem" should be understood to encompass a tangible entity, be that an entity that is physically constructed permanently configured (hardwired) or temporarily configured (programmed) to operate in a certain manner and/or to perform certain operations described herein.

FIG. 1 is a block diagram 100 of a computer-implemented system 106 for determining one or more expressions of one or more users 102 to optimize a user experience in one or more digital interactive platforms, in accordance with an embodiment of the present disclosure. The computer-implemented system 106 is configured to optimize the user experience by determining one or more face expressions of the one or more users 102. The computer-implemented system 106 is configured to determine an engagement level of the one or more users 102 in the one or more digital interactive platforms and accordingly the computer-implemented system 106 overlays second one or more virtual objects on first one or more virtual objects present in one or more locations in one or more video contents associated with the one or more digital interactive platforms to maximize the user experience in the one or more digital interactive platforms.

The computer-implemented system 106 is initially configured to generate the one or more video contents associated with the one or more digital interactive platforms. The computer-implemented system 106 is further configured to identify at least one of: a first state of the one or more video contents associated with the one or more digital interactive platforms and corresponding one or more animated media contents played in the one or more video contents associated with the one or more digital interactive platforms. In an embodiment, the first state of the one or more video contents may be a current state of the one or more video contents associated with the one or more digital interactive platforms.

The computer-implemented system 106 is further configured to determine the one or more face expressions of the one or more users 102 based on the first state of the one or more video contents associated with the one or more digital interactive platforms and the corresponding one or more animated media contents (i.e., video variations to be played with the one or more video contents) played in the one or more video contents associated with the one or more digital interactive platforms, by a machine learning model. The computer-implemented system 106 is further configured to determine the engagement level of the one or more users 102 in the one or more digital interactive platforms based on the one or more determined face expressions of the one or more users 102.

The computer-implemented system 106 is further configured to determine whether the second one or more virtual objects is overlaid on the first one or more virtual objects present in the one or more locations in the one or more video contents associated with the one or more digital interactive platforms, based on the determined engagement level of the one or more users 102 in the one or more digital interactive platforms, to optimize the user experience in the one or more digital interactive platforms, by at least one of: a segmentation model and a deep learning model. In an embodiment, the overlaid of the second one or more virtual objects on the first one or more virtual objects is played with the one or more video contents based on the determined engagement level of the one or more users 102 in the one or more digital interactive platforms, to maximize the user experience in the one or more digital interactive platforms.

In an embodiment, the computer-implemented system 106 may be hosted on a central server including at least one of: a cloud server, a remote server, and the like. In another embodiment, the computer-implemented system 106 as the central server may determine the engagement level of the one or more users 102 in the one or more digital interactive platforms based on the one or more determined face expressions of the one or more users 102. The computer-implemented system 106 as the central server may further determine whether the second one or more virtual objects is overlaid on the first one or more virtual objects present in the one or more locations in the one or more video contents associated with the one or more digital interactive platforms, based on the determined engagement level of the one or more users 102 in the one or more digital interactive platforms, to optimize the user experience in the one or more digital interactive platforms, based on above said processes.

In an embodiment, the computer-implemented system 106 may be communicatively connected to one or more user devices 104 through a communication network 110. The communication network 110 may be at least one of: a Wireless-Fidelity (Wi-Fi) connection, a hotspot connection, a Bluetooth connection, a local area network (LAN), a wide area network (WAN), any other wireless network, and the like. In an embodiment, the one or more user devices 104 may be at least one of: a personal computer, a Smartphone, an electronic notebook, a laptop, and the like.

Figure 2:
FIG. 2 is a detailed view of the computer-implemented system, such as those shown in FIG. 1, in accordance with an embodiment of the present disclosure.
Figure 2:
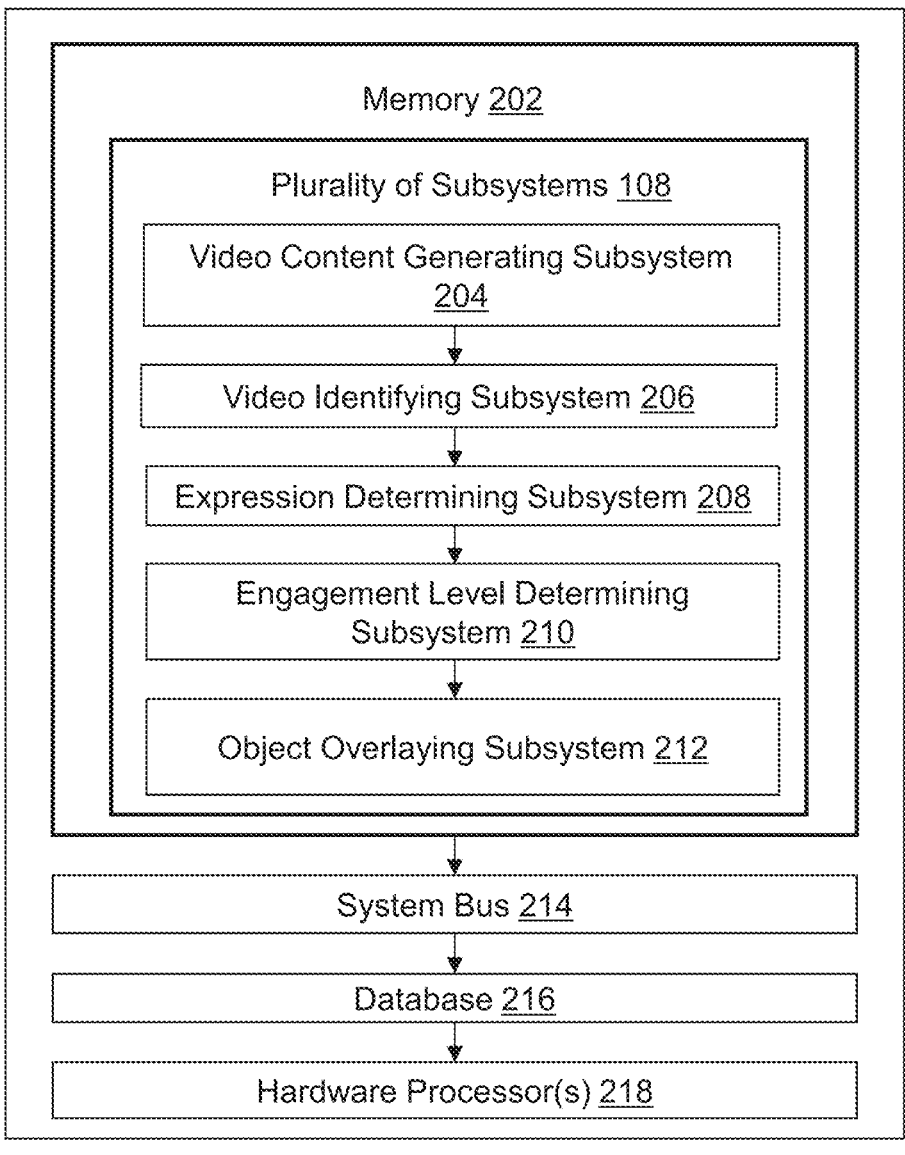

FIG. 2 is a detailed view of the computer-implemented system 106, such as those shown in FIG. 1, in accordance with an embodiment of the present disclosure. The computer-implemented system 106 includes one or more hardware processor(s) 218. The computer-implemented system 106 further includes a memory 202 coupled to the one or more hardware processor(s) 218. The memory 202 includes a set of program instructions in form of the plurality of subsystems 108.

The one or more hardware processor(s) 218, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a digital signal processor, or any other type of processing circuit, or a combination thereof.

The memory 202 includes the plurality of subsystems 108 stored in the form of executable program which instructs the one or more hardware processor(s) 218 via a system bus 214 to perform the above-mentioned method steps. The plurality of subsystems 108 includes following subsystems: a video content generating subsystem 204, a video identifying subsystem 206, an expression determining subsystem 208, an engagement level determining subsystem 210, and an object overlaying subsystem 212.

Computer memory elements may include any suitable memory device(s) for storing data and executable program, such as read only memory, random access memory, erasable programmable read only memory, electronically erasable programmable read only memory, hard drive, removable media drive for handling memory cards and the like. Embodiments of the present subject matter may be implemented in conjunction with program modules, including functions, procedures, data structures, and application programs, for performing tasks, or defining abstract data types or low-level hardware contexts. Executable program stored on any of the above-mentioned storage media may be executable by the one or more hardware processor(s) 218.

The plurality of subsystems 108 includes the video content generating subsystem 204 that is communicatively connected to the one or more hardware processor(s) 218. The video content generating subsystem 204 is configured to generate the one or more video contents associated with the one or more digital interactive platforms.

The plurality of subsystems 108 further includes the video identifying subsystem 206 that is communicatively connected to the one or more hardware processor(s) 218. The video identifying subsystem 206 is configured to identify at least one of: the first state of the one or more video contents associated with the one or more digital interactive platforms and the corresponding one or more animated media contents played in the one or more video contents associated with the one or more digital interactive platforms. In an embodiment, the first state of the one or more video contents may be the current state of the one or more video contents associated with the one or more digital interactive platforms.

The plurality of subsystems 108 further includes the expression determining subsystem 208 that is communicatively connected to the one or more hardware processor(s) 218. The expression determining subsystem 208 is configured to determine the one or more face expressions of the one or more users 102 based on the first state of the one or more video contents associated with the one or more digital interactive platforms and the corresponding one or more animated media contents played in the one or more video contents associated with the one or more digital interactive platforms, by the machine learning model.

In an embodiment, for determining the one or more face expressions of the one or more users 102 by the machine learning model, the expression determining subsystem 208 is configured to obtain data associated with at least one of: the first state of the one or more video contents associated with the one or more digital interactive platforms and the corresponding one or more animated media contents played in the one or more video contents associated with the one or more digital interactive platforms, from the video identifying subsystem 206.

The expression determining subsystem 208 is further configured to compare the obtained data associated with at least one of: the first state of the one or more video contents associated with the one or more digital interactive platforms and the corresponding one or more animated media contents played in the one or more video contents associated with the one or more digital interactive platforms, with pre-stored data associated with one or more characters assigned with one or more face expressions.

The expression determining subsystem 208 is further configured to identify the one or more characters assigned with the one or more face expressions based on the comparison of the obtained data associated with at least one of: the first state of the one or more video contents associated with the one or more digital interactive platforms and the corresponding one or more animated media contents played in the one or more video contents associated with the one or more digital interactive platforms, with the pre-stored data associated with the one or more characters assigned with the one or more face expressions.

The expression determining subsystem 208 is further configured to determine the one or more face expressions of the one or more users 102 based on the identification of the one or more characters assigned with the one or more face expressions.

The plurality of subsystems 108 further includes the engagement level determining subsystem 210 that is communicatively connected to the one or more hardware processor(s) 218. The engagement level determining subsystem 210 is configured to determine the engagement level of the one or more users 102 in the one or more digital interactive platforms based on the one or more determined face expressions of the one or more users 102.

The plurality of subsystems 108 further includes the object overlaying subsystem 212 that is communicatively connected to the one or more hardware processor(s) 218. The object overlaying subsystem 212 is configured to determine whether the second one or more virtual objects is overlaid on the first one or more virtual objects present in the one or more locations in the one or more video contents associated with the one or more digital interactive platforms, based on the determined engagement level of the one or more users 102 in the one or more digital interactive platforms, to optimize the user experience in the one or more digital interactive platforms, by at least one of: the segmentation model and the deep learning model.

In an embodiment, for determining whether the second one or more virtual objects is overlaid on the first one or more virtual objects present in one or more locations in the one or more video contents associated with the one or more digital interactive platforms, by the segmentation model, the object overlaying subsystem 212 is configured to identify one or more keypoints of the first one or more virtual objects present in the one or more locations in the one or more video contents.

The object overlaying subsystem 212 is further configured to segment the first one or more virtual objects in the one or more video contents. In an embodiment, the first one or more virtual objects includes at least one of: the one or more characters, a virtual ground, and the like associated with the one or more digital interactive platforms. The object overlaying subsystem 212 is further configured to overlay the second one or more virtual objects on the first one or more virtual objects present in one or more locations in the one or more video contents associated with the one or more digital interactive platforms, in order to maximize the user experience in the one or more digital interactive platforms.

For an instance, when the one or more users 102 is playing a cricket sport in the digital interactive platform. The expression determining subsystem 208 is configured to determine the one or more face expressions of the one or more users 102 based on the one or more video contents (e.g., a character is hitting six) and the corresponding one or more animated media contents (e.g., a smiling face of the character upon hitting six) played in the one or more video contents, by the machine learning model.

The engagement level determining subsystem 210 is configured to determine the engagement level of the one or more users 102 as happy/interested in the digital interactive platform (i.e., the cricket sport) based on the one or more determined face expressions of the one or more users 102. The engagement level determining subsystem 210 is further configured to determine the engagement level of the one or more users 102 as sad/bored in the digital interactive platform (i.e., the cricket sport), when the character is out.

The object overlaying subsystem 212 overlays the second one or more virtual objects (e.g., an advertisement related media content, an encouraging related media content, and the like) in the first one or more virtual objects (e.g., a t-shirt of the character, the playground, and the like) present in the one or more locations in the digital interactive platform to maximize the engagement level of the one or more users 102 in the digital interactive platform. In this way, the user experience in the one or more digital interactive platforms can be maximized/optimized.

In an embodiment, the object overlaying subsystem 212 is further configured to identify the one or more locations including the first one or more virtual objects in the one or more video contents, on which the second one or more virtual objects is overlaid, by the deep learning model. In an embodiment, the one or more locations in the one or more video contents may be changed over a time period.

In an embodiment, the object overlaying subsystem 212 is further configured to determine temporal stability between the second one or more virtual objects and the first one or more virtual objects present in the one or more locations in the one or more video contents on which the second one or more virtual objects is overlaid, by analyzing changes in the one or more keypoints associated with the first one or more virtual objects, based on a non-maximum suppression (NMS) method.

In an embodiment, the changes in the one or more keypoints associated with the first one or more virtual objects are analyzed based on determination of whether one bounding box is enclosed over one or more regions of the first one or more virtual objects present in the one or more locations in the one or more video contents. In an embodiment, the object overlaying subsystem 212 is further configured to perform real-time operations of identification of the one or more locations in the one or more video contents based on a Pyodide application.

Figure 3:
FIG. 3 is an overall process flow for determining the one or more face expressions of the one or more users to optimize the user experience in the one or more digital interactive platforms, such as those shown in FIG. 1, in accordance with an embodiment of the present disclosure.
Figure 3:
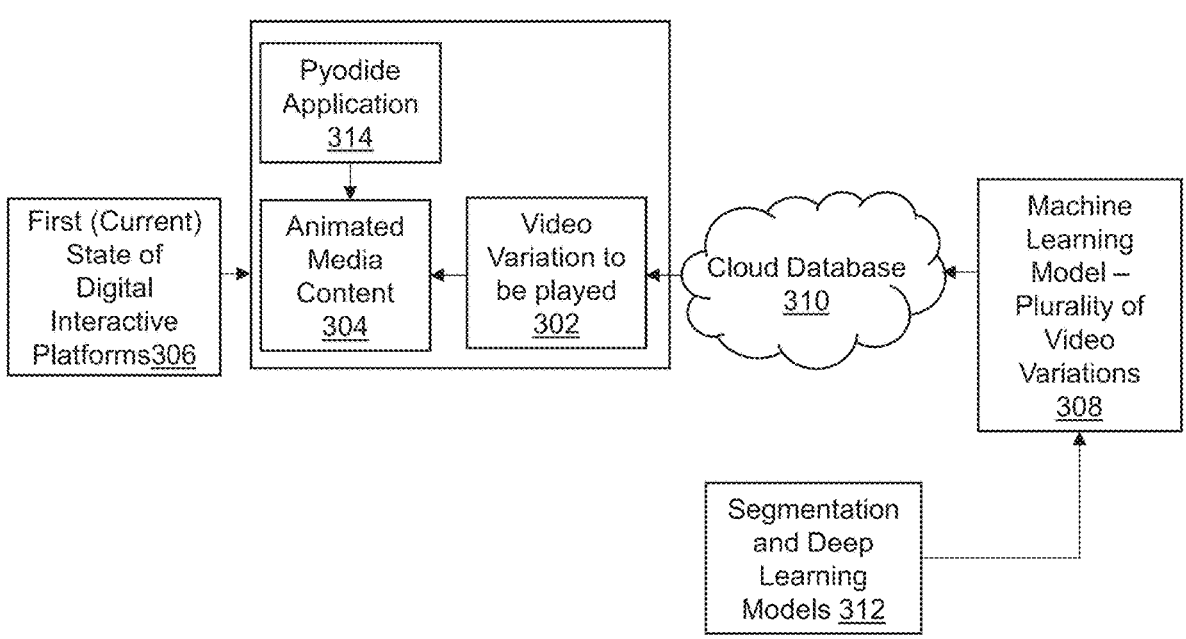

FIG. 3 is an overall process flow 300 for determining the one or more face expressions of the one or more users 102 to optimize the user experience in the one or more digital interactive platforms, such as those shown in FIG. 1, in accordance with an embodiment of the present disclosure.

The at least one of: the first state of the one or more video contents associated with the one or more digital interactive platforms (as shown in step 306) and the corresponding one or more video variations played in the one or more video contents associated with the one or more digital interactive platforms, is identified, as shown in step 302.

In an embodiment, the corresponding one or more video variations is played as the one or more animated media contents with the one or more video contents, as shown in step 304.

The machine learning model determines the one or more face expressions of the one or more users 102 based on the first state of the one or more video contents associated with the one or more digital interactive platforms and the corresponding one or more video variations played in the one or more video contents associated with the one or more digital interactive platforms, as shown in step 308.

In an embodiment, the plurality of video variations (i.e., the one or more animated media contents) associated with the one or more expressions of the one or more users 102, are pre-stored in a cloud database, as shown in step 310.

The engagement level of the one or more users 102 in the one or more digital interactive platforms is determined based on the one or more determined face expressions of the one or more users 102. The second one or more virtual objects is overlaid on the first one or more virtual objects present in one or more locations in the one or more video contents associated with the one or more digital interactive platforms, based on the determined engagement level of the one or more users 102 in the one or more digital interactive platforms, to optimize the user experience in the one or more digital interactive platforms, by at least one of: the segmentation model and the deep learning model, as shown in step 312.

The real-time operations of identification of the one or more locations in the one or more video contents is identified based on the Pyodide application, as shown in step 314.

FIG. 4 is a flow chart depicting a computer-implemented method 400 for determining the one or more face expressions of the one or more users 102 to optimize the user experience in the one or more digital interactive platforms, in accordance with an embodiment of the present disclosure.

At step 402, the one or more video contents associated with the one or more digital interactive platforms is generated.

At step 404, the at least one of: the first state of the one or more video contents associated with the one or more digital interactive platforms and the corresponding one or more animated media contents played in the one or more video contents associated with the one or more digital interactive platforms, is identified.

At step 406, the one or more face expressions of the one or more users 102 is determined based on the first state of the one or more video contents associated with the one or more digital interactive platforms and the corresponding one or more animated media contents played in the one or more video contents associated with the one or more digital interactive platforms, by the machine learning model.

At step 408, the engagement level of the one or more users 102 in the one or more digital interactive platforms is determined based on the one or more determined face expressions of the one or more users 102.

At step 410, the computer-implemented method 400 determines determine whether the second one or more virtual objects is overlaid on the first one or more virtual objects present in the one or more locations in the one or more video contents associated with the one or more digital interactive platforms, based on the determined engagement level of the one or more users 102 in the one or more digital interactive platforms, to optimize the user experience in the one or more digital interactive platforms, by at least one of: the segmentation model and the deep learning model. In an embodiment, the overlaid of the second one or more virtual objects on the first one or more virtual objects is played with the one or more video contents based on the determined engagement level of the one or more users 102 in the one or more digital interactive platforms.

The present invention has following advantages. The present invention is configured to optimize the user experience in the one or more digital interactive platforms by determining the engagement level of the one or more users 102 in the one or more digital interactive platforms based on the one or more determined face expressions of the one or more users 102. The present invention with the computer-implemented system 106 is configured to provide variety of the one or more animated media contents including the overlaid of the second one or more virtual objects on the first one or more virtual objects present in the one or more locations in the one or more video contents associated with the one or more digital interactive platforms.

The present invention is configured to reduce one or more user inputs from the one or more users 102 for determining the engagement level of the one or more users 102, by the machine learning model. By this way, the determination of the engagement level of the one or more users 102 is more accurate.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments herein can comprise hardware and software elements. The embodiments that are implemented in software include but are not limited to, firmware, resident software, microcode, and the like. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, an apparatus, or a device.

The medium can be an electronic, a magnetic, an optical, an electromagnetic, an infrared, or a semiconductor system (or an apparatus or a device) or a propagation medium. Examples of a computer-readable medium include a semi-conductor or solid-state memory, a magnetic tape, a removable computer diskette, a random-access memory (RAM), a read-only memory (ROM), a rigid magnetic disk and an optical disk. Current examples of optical disks include a compact disk-read only memory (CD-ROM), a compact disk-read/write (CD-R/W) and a DVD.

Input/output (I/O) devices (including but not limited to keyboards, displays, pointing devices, and the like.) can be coupled to the computer-implemented system 106 either directly or through intervening I/O controllers. Network adapters may also be coupled to the computer-implemented system 106 to enable a data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/computer-implemented system 106 in accordance with the embodiments herein. The computer-implemented system 106 herein comprises at least one of: a processor or a central processing unit (CPU). The CPUs are interconnected via the system bus 214 to various devices such as a random-access memory (RAM), read-only memory (ROM), and an input/output (I/O) adapter. The I/O adapter can connect to peripheral devices, such as disk units and tape drives, or other program storage devices that are readable by the computer-implemented system 106. The computer-implemented system 106 can read the inventive instructions on the program storage devices and follow these instructions to execute the methodology of the embodiments herein.

The computer-implemented system 106 further includes a user interface adapter that connects a keyboard, a mouse, a speaker, a microphone, and/or other user interface devices such as a touch screen device (not shown) to the bus to gather user input. Additionally, a communication adapter connects the bus to a data processing network, and a display adapter connects the bus to a display device which may be embodied as an output device such as a monitor, a printer, or a transmitter, for example.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/ article. Similarly, where more than one device or article is described herein (whether or not they cooperate), it will be apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, and the like. Of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

We claim:

1. A computer-implemented system for determining one or more face expressions of one or more users to optimize a user experience in one or more digital interactive platforms, the computer-implemented system comprising:
   one or more hardware processors; and
   a memory coupled to the one or more hardware processors, wherein the memory comprises a set of program instructions in form of a plurality of subsystems, configured to be executed by the one or more hardware processors, wherein the plurality of subsystems comprises:
      a video content generating subsystem configured to generate one or more video contents associated with the one or more digital interactive platforms;
      a video identifying subsystem configured to identify at least one of: a first state of the one or more video contents associated with the one or more digital interactive platforms and corresponding one or more animated media contents played in the one or more video contents associated with the one or more digital interactive platforms;

an expression determining subsystem configured to determine the one or more face expressions of the one or more users based on the first state of the one or more video contents associated with the one or more digital interactive platforms and the corresponding one or more animated media contents played in the one or more video contents associated with the one or more digital interactive platforms, by a machine learning model;
      an engagement level determining subsystem configured to determine an engagement level of the one or more users in the one or more digital interactive platforms based on the one or more determined face expressions of the one or more users; and
      an object overlaying subsystem configured to determine whether second one or more virtual objects is overlaid on first one or more virtual objects present in one or more locations in the one or more video contents associated with the one or more digital interactive platforms, based on the determined engagement level of the one or more users in the one or more digital interactive platforms, to optimize the user experience in the one or more digital interactive platforms, by at least one of: a segmentation model and a deep learning model,
      wherein the overlaid of the second one or more virtual objects on the first one or more virtual objects is played with the one or more video contents based on the determined engagement level of the one or more users in the one or more digital interactive platforms.

2. The computer-implemented system as claimed in claim 1, wherein in determining, by the machine learning model, the one or more face expressions of the one or more users, the expression determining subsystem is configured to:
   obtain data associated with at least one of: the first state of the one or more video contents associated with the one or more digital interactive platforms and the corresponding one or more animated media contents played in the one or more video contents associated with the one or more digital interactive platforms, from the video identifying subsystem;
   compare the obtained data associated with at least one of: the first state of the one or more video contents associated with the one or more digital interactive platforms and the corresponding one or more animated media contents played in the one or more video contents associated with the one or more digital interactive platforms, with pre-stored data associated with one or more characters assigned with one or more face expressions;
   identify the one or more characters assigned with the one or more face expressions based on the comparison of the obtained data associated with at least one of: the first state of the one or more video contents associated with the one or more digital interactive platforms and the corresponding one or more animated media contents played in the one or more video contents associated with the one or more digital interactive platforms, with the pre-stored data associated with the one or more characters assigned with the one or more face expressions; and
   determine the one or more face expressions of the one or more users based on the identification of the one or more characters assigned with the one or more face expressions.

3. The computer-implemented system as claimed in claim 1, wherein in determining, by the segmentation model, whether the second one or more virtual objects is overlaid on the first one or more virtual objects present in the one or more locations in the one or more video contents associated with the one or more digital interactive platforms, the object overlaying subsystem is configured to:

identify one or more keypoints of the first one or more virtual objects present in the one or more locations in the one or more video contents;

segment the first one or more virtual objects in the one or more video contents, wherein the first one or more virtual objects comprises at least one of: the one or more characters, a virtual ground associated with the one or more digital interactive platforms; and overlay the second one or more virtual objects on the first one or more virtual objects present in one or more locations in the one or more video contents associated with the one or more digital interactive platforms.

4. The computer-implemented system as claimed in claim 1, wherein the object overlaying subsystem is further configured to identify the one or more locations comprising the first one or more virtual objects in the one or more video contents, on which the second one or more virtual objects is overlaid, by the deep learning model, and wherein the one or more locations in the one or more video contents is changed over a time period.

5. The computer-implemented system as claimed in claim 3, wherein the object overlaying subsystem is further configured to determine temporal stability between the second one or more virtual objects and the first one or more virtual objects present in the one or more locations in the one or more video contents on which the second one or more virtual objects is overlaid, by analyzing changes in the one or more keypoints associated with the first one or more virtual objects, based on a non-maximum suppression (NMS) method.

6. The computer-implemented system as claimed in claim 5, wherein the changes in the one or more keypoints associated with the first one or more virtual objects are analyzed based on determination of whether one bounding box is enclosed over one or more regions of the first one or more virtual objects present in the one or more locations in the one or more video contents.

7. The computer-implemented system as claimed in claim 4, wherein the object overlaying subsystem is further configured to perform real-time operations of identification of the one or more locations in the one or more video contents based on a Pyodide application.

8. A computer-implemented method for determining one or more face expressions of one or more users to optimize a user experience in one or more digital interactive platforms, the computer-implemented method comprising:

generating, by one or more hardware processors, one or more video contents associated with the one or more digital interactive platforms;

identifying, by the one or more hardware processors, at least one of: a first state of the one or more video contents associated with the one or more digital interactive platforms and corresponding one or more animated media contents played in the one or more video contents associated with the one or more digital interactive platforms;

determining, by the one or more hardware processors, the one or more face expressions of the one or more users based on the first state of the one or more video contents associated with the one or more digital interactive platforms and the corresponding one or more animated media contents played in the one or more video contents associated with the one or more digital interactive platforms, by a machine learning model;

determining, by the one or more hardware processors, an engagement level of the one or more users in the one or more digital interactive platforms based on the one or more determined face expressions of the one or more users; and determining, by the one or more hardware processors, whether second one or more virtual objects is overlaid on first one or more virtual objects present in one or more locations in the one or more video contents associated with the one or more digital interactive platforms, based on the determined engagement level of the one or more users in the one or more digital interactive platforms, to optimize the user experience in the one or more digital interactive platforms, by at least one of: a segmentation model and a deep learning model, wherein the overlaid of the second one or more virtual objects on the first one or more virtual objects is played with the one or more video contents based on the determined engagement level of the one or more users in the one or more digital interactive platforms.

9. The computer-implemented method as claimed in claim 8, wherein determining, by the machine learning model, the one or more face expressions of the one or more users, comprises:

obtaining, by the one or more hardware processors, data associated with at least one of: the first state of the one or more video contents associated with the one or more digital interactive platforms and the corresponding one or more animated media contents played in the one or more video contents associated with the one or more digital interactive platforms, from the video identifying subsystem;

comparing, by the one or more hardware processors, the obtained data associated with at least one of: the first state of the one or more video contents associated with the one or more digital interactive platforms and the corresponding one or more animated media contents played in the one or more video contents associated with the one or more digital interactive platforms, with pre-stored data associated with one or more characters assigned with one or more face expressions;

identifying, by the one or more hardware processors, the one or more characters assigned with the one or more face expressions based on the comparison of the obtained data associated with at least one of: the first state of the one or more video contents associated with the one or more digital interactive platforms and the corresponding one or more animated media contents played in the one or more video contents associated with the one or more digital interactive platforms, with the pre-stored data associated with the one or more characters assigned with the one or more face expressions; and determining, by the one or more hardware processors, the one or more face expressions of the one or more users based on the identification of the one or more characters assigned with the one or more face expressions.

10. The computer-implemented method as claimed in claim 8, wherein determining, by the segmentation model, whether the second one or more virtual objects is overlaid on the first one or more virtual objects present in the one or more locations in the one or more video contents associated with the one or more digital interactive platforms, comprises:

identifying, by the one or more hardware processors, one or more keypoints of the first one or more virtual objects present in the one or more locations in the one or more video contents;

segmenting, by the one or more hardware processors, the first one or more virtual objects in the one or more video contents, wherein the first one or more virtual objects comprises at least one of: the one or more characters, a virtual ground associated with the one or more digital interactive platforms; and overlaying, by the one or more hardware processors, the second one or more virtual objects on the first one or more virtual objects present in one or more locations in the one or more video contents associated with the one or more digital interactive platforms.

11. The computer-implemented method as claimed in claim 8, further comprising identifying, by the one or more hardware processors, the one or more locations comprising the first one or more virtual objects in the one or more video contents, on which the second one or more virtual objects is overlaid, by the deep learning model, wherein the one or more locations in the one or more video contents is changed over a time period.

12. The computer-implemented method as claimed in claim 10, further comprising determining, by the one or more hardware processors, temporal stability between the second one or more virtual objects and the first one or more virtual objects present in the one or more locations in the one or more video contents on which the second one or more virtual objects is overlaid, by analyzing changes in the one or more keypoints associated with the first one or more virtual objects, based on a non-maximum suppression (NMS) method.

13. The computer-implemented method as claimed in claim 12, wherein the changes in the one or more keypoints associated with the first one or more virtual objects are analyzed based on determination of whether one bounding box is enclosed over one or more regions of the first one or more virtual objects present in the one or more locations in the one or more video contents.

14. The computer-implemented method as claimed in claim 11, further comprising performing, by the one or more hardware processors, real-time operations of identification of the one or more locations in the one or more video contents based on a Pyodide application.

\* \* \* \* \*